United States Patent [19]

Shukla et al.

[11] Patent Number: 4,951,648
[45] Date of Patent: Aug. 28, 1990

[54] CONVEYOR OVEN

[75] Inventors: Kailash C. Shukla, Stow; James R. Hurley, Weymouth; Conrad J. Orcheski, Maynard; Michael P. Grimanis, Medford, all of Mass.

[73] Assignee: Tecogen, Inc., Waltham, Mass.

[21] Appl. No.: 327,825

[22] Filed: Mar. 23, 1989

[51] Int. Cl.$^5$ .................. A21B 1/00; F24C 15/32
[52] U.S. Cl. .................. 126/21 A; 126/21 R; 99/443 C; 99/451; 99/386; 99/331; 432/152; 432/199; 34/218; 34/225
[58] Field of Search .......... 126/21 A, 21 R, 19 R, 126/273 R; 99/443 C, 451, 386, 331; 219/388, 400, 401; 432/152, 199; 34/4, 218, 207, 210, 225

[56] References Cited

U.S. PATENT DOCUMENTS

| | | | |
|---|---|---|---|
| 784,854 | 3/1905 | Grace | 99/386 |
| 2,908,235 | 10/1959 | Naylor et al. | 107/63 |
| 3,682,643 | 8/1972 | Foster | 99/451 |
| 3,823,660 | 7/1974 | Netherling | 99/386 |
| 4,023,007 | 5/1977 | Brown | 219/388 |
| 4,045,166 | 8/1977 | Kaleel | 432/146 |
| 4,121,509 | 10/1978 | Baker et al. | 99/386 |
| 4,154,861 | 5/1979 | Smith | 426/466 |
| 4,176,589 | 12/1979 | Stuck | 99/386 |
| 4,366,177 | 12/1982 | Wells et al. | 426/243 |
| 4,368,664 | 1/1983 | Smith et al. | 99/386 |
| 4,377,109 | 3/1983 | Brown et al. | 99/401 |
| 4,386,558 | 6/1983 | Holman et al. | 126/21 A |
| 4,389,562 | 6/1983 | Chandoir | 219/388 |
| 4,421,015 | 12/1983 | Masters et al. | 99/332 |
| 4,438,572 | 3/1984 | Kaminski | 34/218 |
| 4,448,117 | 5/1984 | Wells | 99/331 |
| 4,448,678 | 6/1969 | Burstein | 99/386 |
| 4,462,307 | 7/1984 | Wells | 99/386 |
| 4,462,383 | 7/1984 | Henke et al. | 126/21 |
| 4,467,783 | 8/1984 | Hurley et al. | 126/378 |
| 4,473,004 | 9/1984 | Wells et al. | 99/386 |
| 4,474,498 | 10/1984 | Smith | 432/144 |
| 4,479,776 | 10/1984 | Smith | 432/144 |
| 4,554,437 | 11/1985 | Wagner et al. | 219/388 |
| 4,556,043 | 12/1985 | Bratton | 126/21 |
| 4,569,328 | 2/1986 | Shukla et al. | 126/39 |
| 4,569,658 | 2/1986 | Wiggins et al. | 432/47 |
| 4,576,090 | 3/1986 | Burea | 99/443 |
| 4,591,333 | 5/1986 | Henke | 432/10 |
| 4,622,946 | 11/1986 | Hurley et al. | 126/39 |
| 4,626,661 | 12/1986 | Henke | 219/400 |
| 4,716,820 | 1/1988 | Stuck | 99/443 C |

OTHER PUBLICATIONS

Pacesetter Conveyor Ovens (brochure), (no date).
The Impinger (brochure), (no date).
The Impinger II (brochure), (no date).

*Primary Examiner*—James C. Yeung
*Attorney, Agent, or Firm*—Fish & Richardson

[57] ABSTRACT

Infrared (IR) strip heaters are juxtaposed with convection heaters for simultaneous, independently controlled, combined radiant/convective heating in a conveyor oven. Apertured plates with portions transmissive to IR radiation are interposed between a lower combined heating unit and the cooking path. The IR heaters are preferably gas burners with porous, ceramic or metallic elements, the burners on opposite sides of the cooking path being independently controllable to vary the heat transfer rate to opposite food surfaces. Symmetrical placement of the IR heaters in opposed pairs facilitates use of the conveyor oven as a half oven. An auxiliary burner exhausts directly into the convection air and is cycled on and off to maintain a set temperature during normal operation.

49 Claims, 10 Drawing Sheets

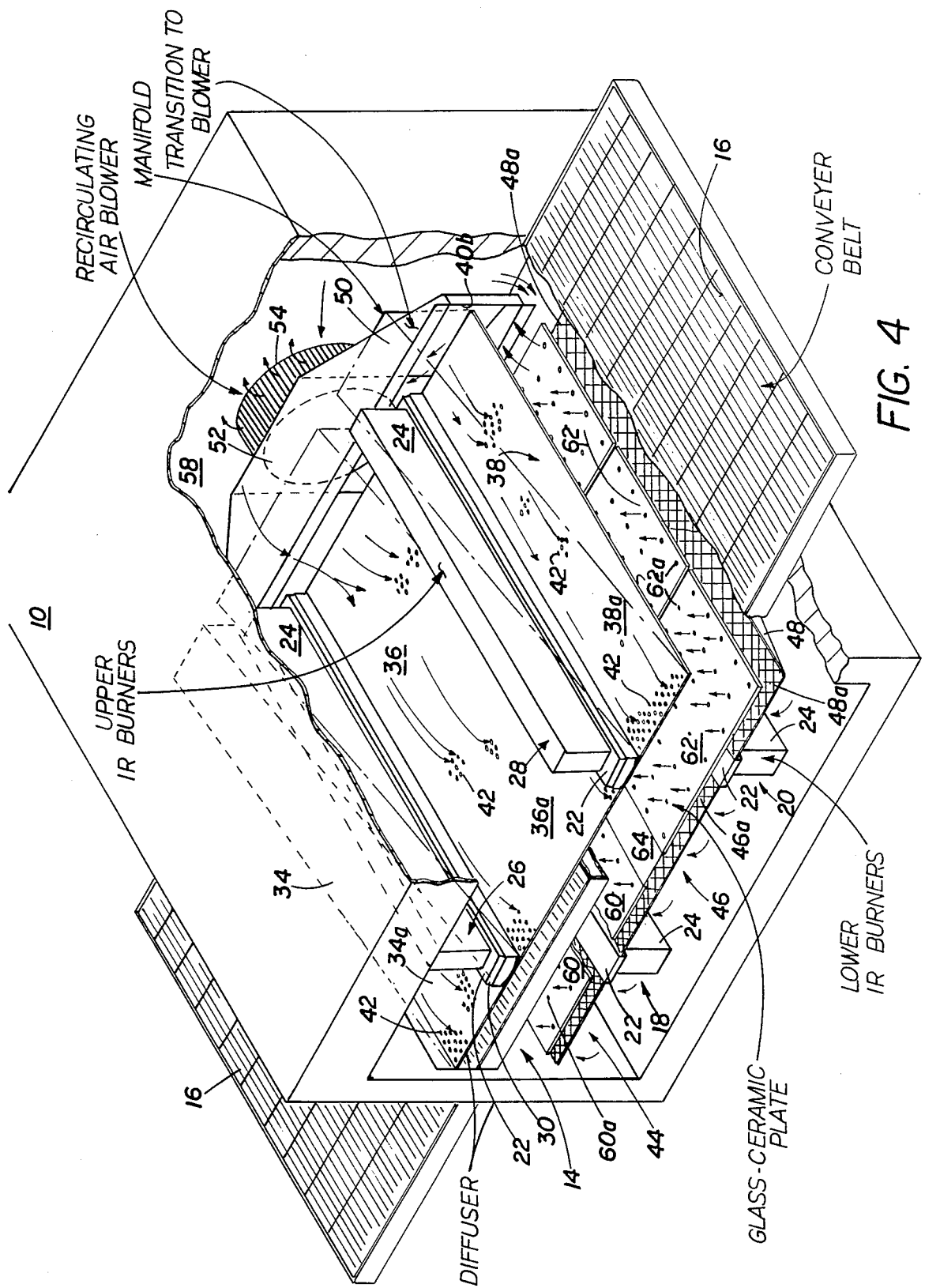

CONVEYOR OVEN

BACKGROUND OF THE INVENTION

The invention relates to conveyor ovens for continuously baking or broiling food products.

In high volume restaurant operations, deck ovens, traditionally used for pizza, for example, have been successfully replaced by conveyor ovens which cut cooking time almost in half. Conveyor oven systems typically use a continuous open link conveyor belt to carry individual food products through a heated oven tunnel. The oven tunnel has openings through which the respective ends of the conveyor extend sufficiently to make it convenient for operators to start incoming food products on one end of the belt and to retrieve cooked products from the other end.

Customer feedback indicates that, to be successful, pizza chains must offer variety and fast service. By its nature, however, pizza is best cooked to order. For high volume operations, pizzas of the same quality as that produced by deck ovens must traverse the conveyor oven in rapid succession. Microwave cooking is not the answer because it tends to dry out food and is not generally conducive to the biochemical reactions which take place in conventional bread or dough baking. Moreover, conveyor ovens offer a better flow of orders through the kitchen than a battery of microwave ovens would permit. In this context, today's commercial conveyor ovens are open to optimization for increased throughput without compromising quality. Decreased cooking time without compromise offers fast food service several benefits.

First, because pizza is commonly perceived as "fast food", customer satisfaction is actually enhanced by serving individualized orders faster. Second, the volume of customer orders served can be increased without sacrificing quality or price. Third, in multiple oven environments, the same collective throughput can be achieved with fewer ovens, thus decreasing capital outlays.

Ideally, conveyor ovens suitable for thick crust pizza should also be able to cook and warm a broad variety of other foods: seafood, Mexican food, hot dogs, sausage, sandwiches, casseroles, biscuits, muffins, etc. In addition, energy consumption should be as low as possible. Thus, a need exists for improving the design of conventional conveyor ovens to produce high quality cooked food products in less time.

SUMMARY OF THE INVENTION

A general feature of the invention is the provision of a conveyor oven with one or more combined convection/infrared heating units. The heating unit includes a forced hot air duct coextensive with the width of the oven tunnel with a porous wall facing the cooking path for exhausting hot air toward food products and an infrared (IR) strip heater also coextensive with the width of the oven tunnel juxtaposed with the convection duct and having a primary source of input heat energy independent of the forced hot air in the convection duct so that convective and radiant heating take place simultaneously and the heat inputs for convective and radiant heating are independently controlled. Preferred embodiments of this aspect of the invention include implementing the strip heater with a gas burner preferably including a porous ceramic element in the shape of a bar extending substantially the width of the conveyor oven. Another general feature of the invention is situating IR strip heaters of the above description between adjacent ones of a plurality of spaced convection ducts. Preferably there are two combined heating units, one on one side of the cooking path and the other on the other side of the cooking path.

Another general aspect of the invention is the provision of a combined heating unit in an oven tunnel on either side of the cooking path with a convection duct and an IR strip heater alongside and parallel to the convection duct with a plate made of IR transparent material disposed between the heating unit and the cooking path such that radiant IR energy passes through the plate to the food products. Radiant energy keeps the surface of the glass plate substantially free of deposits by self-cleaning action. Several interchangeable plates may be used to cover one strip heater. In one embodiment, the plates extend over the adjacent convection duct or ducts and are apertured over the duct area to pass convection air.

A further aspect of the invention is the provision of pairs of IR strip heaters on either side of the cooking path in opposed relationship, a first pair of IR strip heaters being displaced approximately one quarter of the length of the oven tunnel from the longitudinal midpoint of the tunnel and the second pair being displaced from the midpoint in the opposite direction by approximately the same distance as the first pair so that the oven is in effect divided symmetrically into two half ovens which may be accessed optionally via a side door. Preferably the upper and lower burners are independently controlled to achieve different rates of radiant heat transfer to the top and bottom surfaces of the food products.

DESCRIPTION OF THE PREFERRED EMBODIMENTS

The drawings are briefly described as follows.

FIG. 4 is a perspective schematic representation of the conveyor oven of FIG. 1 with portions broken away to illustrate the relationship between the upper and lower heating units and air circulation system.

STRUCTURE

Figure 1:
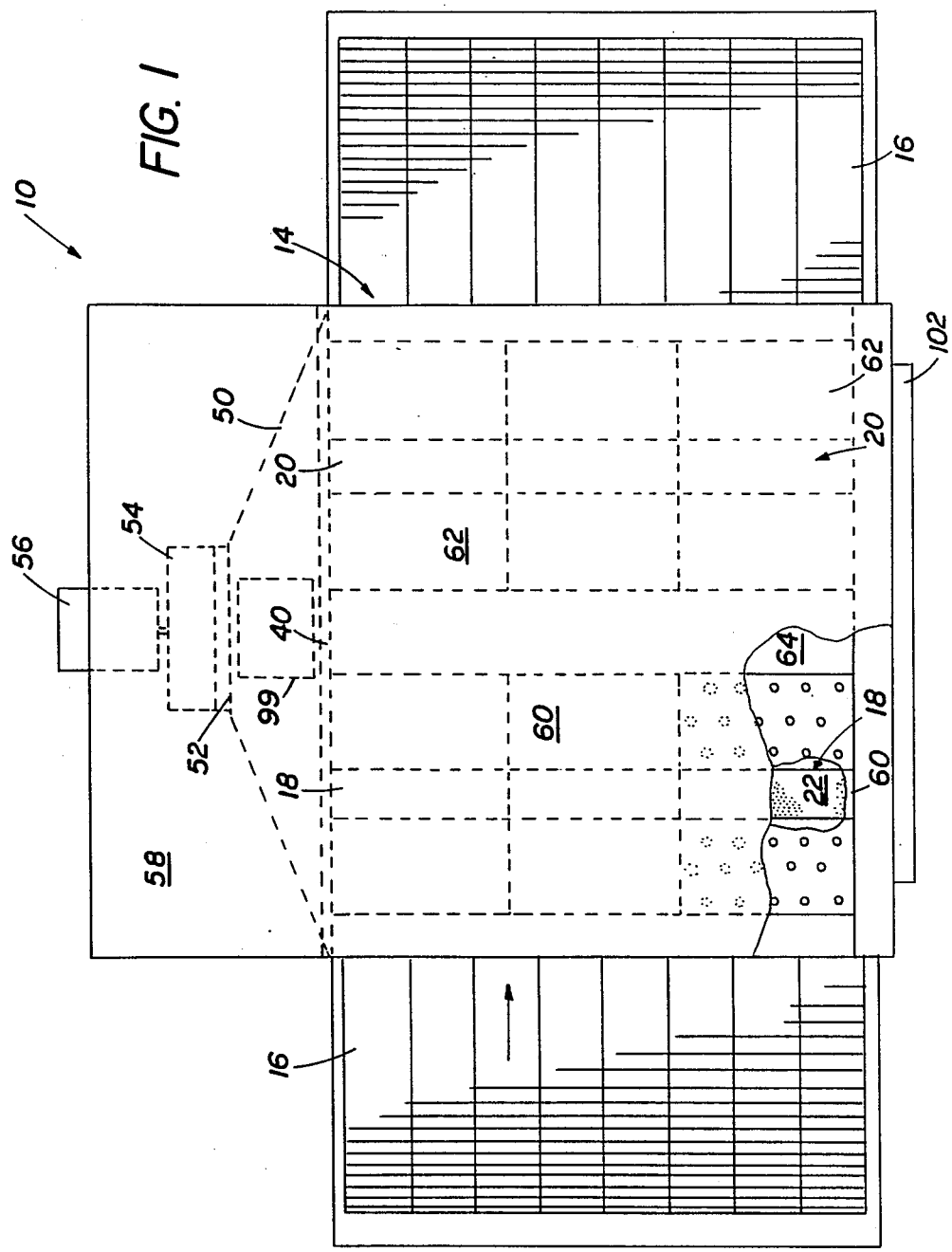
FIG. 1 is a plan view of the conveyor oven according to the invention with portions cut away to reveal one of the lower heating units.
Figure 2:
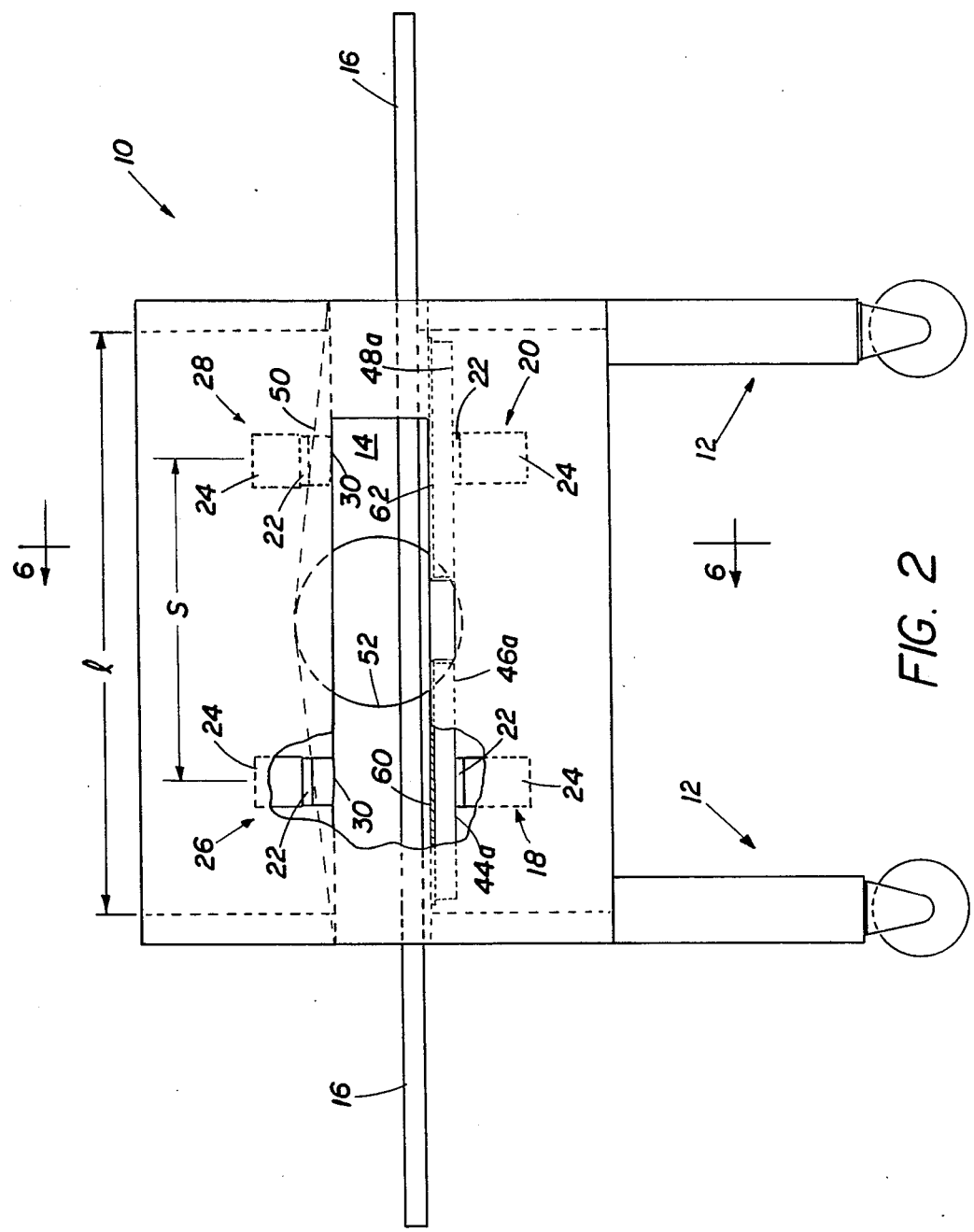
FIG. 2 is a side view of the conveyor oven of FIG. 1 with the side door removed and portions broken away to show details of a pair of opposed upper and lower heating units.
Figure 3:
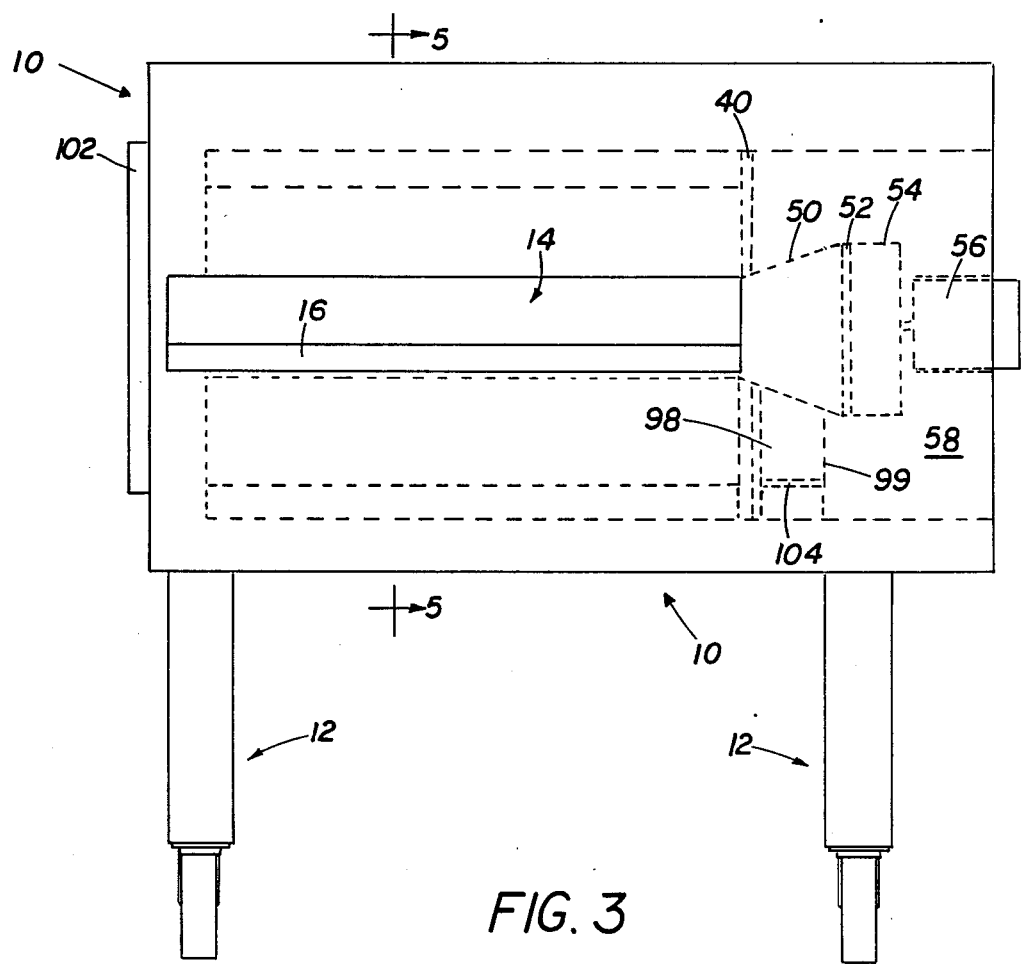
FIG. 3 is an end view of the oven of FIG. 1 taken from the right side as shown in FIG. 2 with portions of the air circulation system shown in phantom.

As shown in FIGS. 1-3, a conveyor oven employing advanced heat transfer technology designed primarily for commercial baking and restaurant operations includes a box-like cabinet 10 with insulated stainless steel walls supported by a four-legged stand 12 (FIGS. 2 and 3). The cabinet 10 has a rectangular, generally horizontal slot 14 (FIG. 3) through opposite side walls forming the oven tunnel through which a conventional framed motorized continuous stainless steel chain link belt assembly 16 is received. The conveyor assembly 16, preferably driven by a variable speed motor (not shown), transports food products to be cooked through the oven tunnel at a constant selected speed.

Combination IR and convection heating units are employed both above and below the oven tunnel 14 as shown in FIGS. 1 and 2. The lower IR units include two parallel gas fired elongated ceramic tile radiant burners 18 and 20. Each burner includes a series of porous ceramic plates or tiles 22, aligned end-to-end, and a burner plenum 24 connected to a gas/air line (82 and 86 in FIG. 9). The preferred ceramic burner tile is made of cordierite, a composition of magnesia, alumina and silica, about one-half inch thick with a typical port diameter of 0.052 inch. Collectively, the ports define an open area of about 35% of the total face area of the tile. Cordierite burner tiles of suitable dimensions are commercially available in the United States from Hamilton Porcelain, Inc. (of Canada), and Morgan Matroc, Inc. (of England).

The burner tiles receive premixed air and gas under pressure, typically specified as input rate or burner "loading" in terms of BTU's per hour per square foot of total face area of the burner tile. At 300,000 BTU's/hr./sq.ft.. and above, a burner condition known as "blue flame mode" is achieved, in which the flame from each port lifts slightly off of the burner. In this mode the burners themselves do not heat up significantly for two reasons: the flame is not in contact with the burner tile and the unignited air/gas mixture flowing through the ports actually serves to cool the burner. In the IR mode the burner itself is heated so that it will radiate IR energy. The IR mode is attained by lowering the input rate sufficiently (e.g., below 100,000 BTU's/hr./sq.ft.) that the flames recede into the ports and conduct heat directly to the burner itself.

With the proper loading, once the air/gas mixture flowing through the tiles is ignited, a myriad of short, closely spaced flames appear on the upper surface of each ceramic tile. The ceramic tiles 22 quickly become red hot and radiate IR energy.

The upper IR units 26 and 28 are parallel to and preferably directly opposite from the lower IR units 18 and 20, as shown in FIG. 2. Upper units 26 and 28 also extend across the entire width of the oven tunnel 14 and are similar to the lower IR units except that they are upside down and in addition have elongated arcuate wire mesh radiator strips 30 spaced below the ceramic tile plates 22, respectively. Like the tile 22, the wire mesh 30 extends the full width of the oven tunnel. The arcuate strips 30 disperse radiant heat over a wider area. IR burners 18 and 26 form a pair of lower and upper opposed radiant heaters, as do IR burners 20 and 28. As shown in FIG. 2, the center line of each pair of opposed burners is preferably spaced from the adjacent end wall (and from the center line of the oven tunnel) by a horizontal distance equal to one quarter of the length 1 (FIG. 2) of the oven tunnel. Thus, the distances between the center lines of the opposed pair of IR burners is approximately one-half 1. This geometry divides the oven tunnel into two symmetrical halves each having one pair of upper and lower burners.

Figure 5:
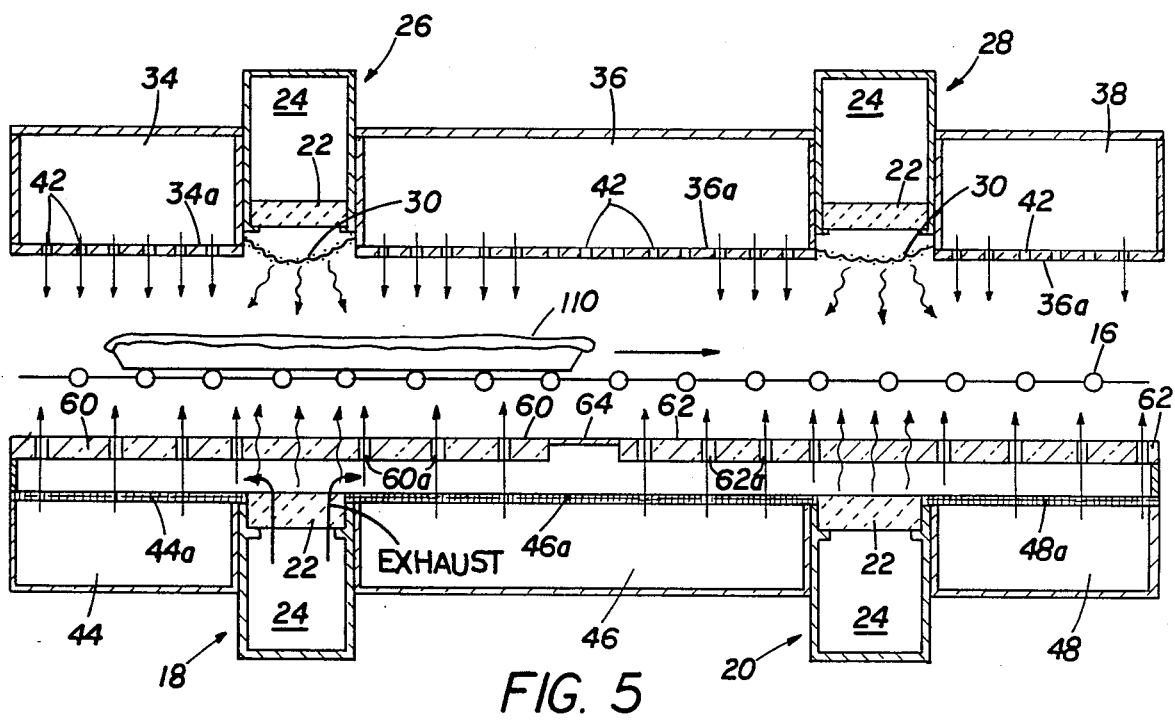
FIG. 5 is a schematic representation of a sectional view of the heating chamber of the conveyor oven taken along lines 5—5 of FIG. 3.
Figure 6:
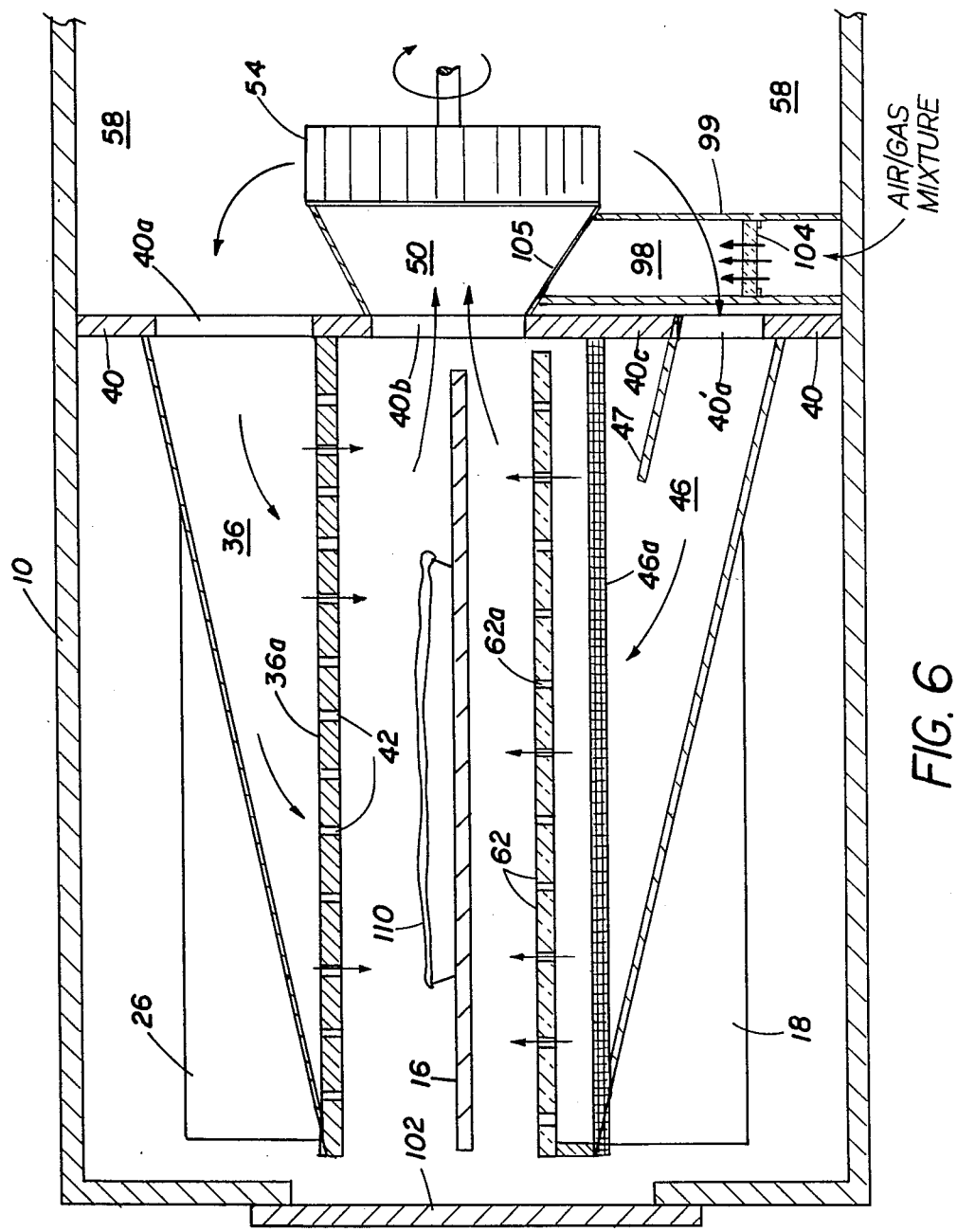
FIG. 6 is a schematic representation of a sectional view showing the heating chamber of the conveyor oven taken along lines 6—6 of FIG. 2.

A forced air convective heating system operates alongside the IR burners. As shown in FIGS. 4-6, three right angle, wedge-shaped, sheet metal ducts forming elongated air manifolds called "plenums" 34, 36 and 38 extend horizontally above the oven tunnel from a supporting vertical partition 40 extending the length of the oven tunnel 14 inside the cabinet 10. Because of the location of the burners 26 and 28, the outer plenums 34 and 38 are each about half as wide in the direction of conveyor travel as the middle plenum 36. Each upper plenum 34, 36, 38 has a floor adjacent to the oven tunnel 14 perforated with openings 42 to form coplanar distributor plates 34a, 36a and 38a. The openings 42 are formed such that gases (indicated by arrows, FIG. 4) entering the hot air plenums 34, 36 and 38 exit the respective distributor plates toward the conveyor belt 16 in parallel streams directed substantially vertically downward. The larger ends of the plenums 34, 36 and 38 are affixed to the partition 40 around respective rectangular openings 40a (FIG. 6).

The lower convective heating unit includes three complementary opposed wedge-shaped plenum-like ducts 44, 46 and 48. The upper surface of each plenum 44, 46, 48 is covered with wire mesh forming horizontal coplanar diffuser screens 44a, 46a and 48a. Like the upper plenums, the lower plenums 44, 46 and 48 are sealed at their larger ends to the partition 40 around respective rectangular openings 40a (FIG. 6). At the back of the oven tunnel, partition 40 has a long slot 40b (FIG. 6) which is connected via a sheet metal transition 50 (FIGS. 1 and 2) to a circular port 52 centered approximately on the center line of the oven tunnel. Coaxially juxtaposed with the circular opening 52 is a centrifugal fan 54 driven by motor 56 mounted through the adjacent wall of the cabinet 10 (FIG. 1). Fan 54 exhausts into the manifold plenum 58 bounded by the partition 40 and adjacent walls of the cabinet 10 which collectively surround the fan 54 and transition 50.

An auxiliary burner assembly 98 (FIG. 6) exhausts directly into the transition 50 to raise the temperature of the convection air on demand. The assembly 98 includes a square duct 99 extending vertically adjacent the partition 40 and joined to the underside of the transition 50. The lower end of the duct 99 is spanned by a ceramic burner tile 104, as shown. The tile may be of similar material to that used for the radiant burners but is more highly loaded to operate in the blue flame mode. The dimensions of the tile in a specific embodiment under evaluation are 47/16 inch square by one-half inch thick with 40% open area. The air/gas mixture is introduced into the plenum defined beneath the square tile 104. A spark plug (not shown) mounted through the side wall of the square duct 99 just above the tile 104 ignites the auxiliary burner. The combustion gases flow upwards and are exhausted into the transition 50 through an opening 105. The auxiliary burner exhaust thus joins the convective flow in the oven.

Lying so close to the transition 50, the adjacent portions of the plenum openings (e.g., 36a and 46a in FIG. 6) are exposed to strong flows which tend to draw a disproportionate amount of convection air out of the plenums nearby the transition. To mitigate this effect, which is exacerbated for the lower central plenum 46 because of the auxiliary burner 98, an angled baffle 47 is arranged inside lower plenum 46 as shown in FIG. 6. In addition, the opening 40a' is partially blocked near the diffuser 46a by a continuation of the partition wall 40c from which the baffle 47 extends as shown. If desired, baffle arrangements may be employed in other plenums (lower or upper) to moderate the flow near the transition 50 by blocking the direct route through the adjacent plenum openings.

Supported above the diffuser screens 44a, 46a and 48a, e.g., about one inch above, are two sets of three IR radiation transmissive apertured glass ceramic plates 60 and 62 (FIG. 1) separated in the center of the oven tunnel by a narrow metal strip 64 running the width of the oven tunnel. The glass ceramic plate is preferably made of a composition containing silica (67% by weight), alumina (19%) and other constituents (14%), preferably about 3 to 5 mm thick. Plates of suitable dimensions are commercially available in the United States under the trademarks "Neoceram-O" (Nippon Electric Glass, Ltd.) and "Robax" (Schott, GmbH). As shown in FIGS. 1 and 5, the plates 60 and 62 are not apertured directly above the IR burners 18 and 20. As compared with the apertures in the distribution plates 34a, 36a and 38a of the upper plenums, the apertures in the plates 60 and 62 are more widely spaced (e.g., two to four times fewer apertures per unit area) and are of larger diameter (preferably about two to three times the average diameter of the perforations in the upper distribution plates).

Figure 7:
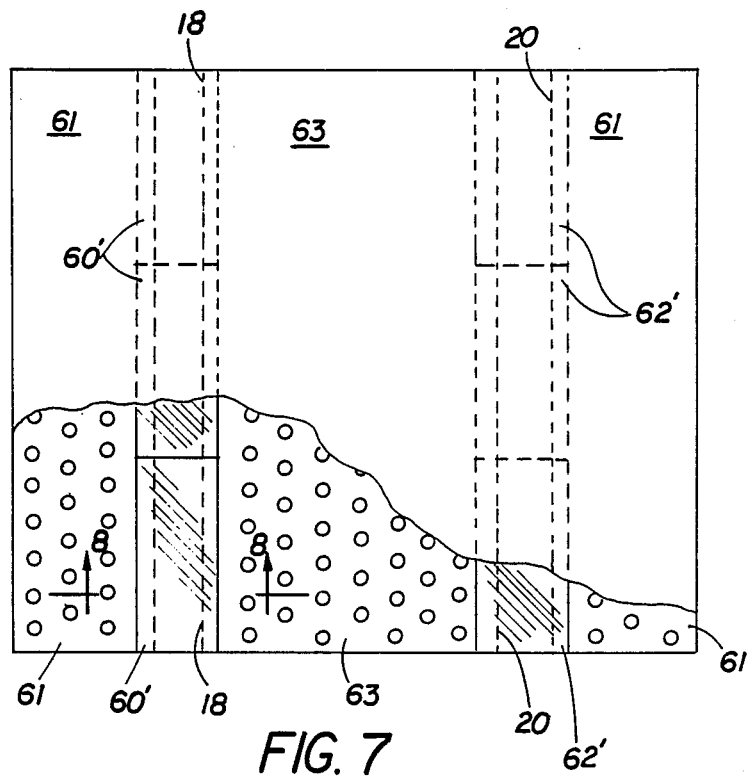
FIG. 7 is a plan schematic view of a portion of the oven illustrating an alternate embodiment of the apertured plates over the lower burners.
Figure 8:
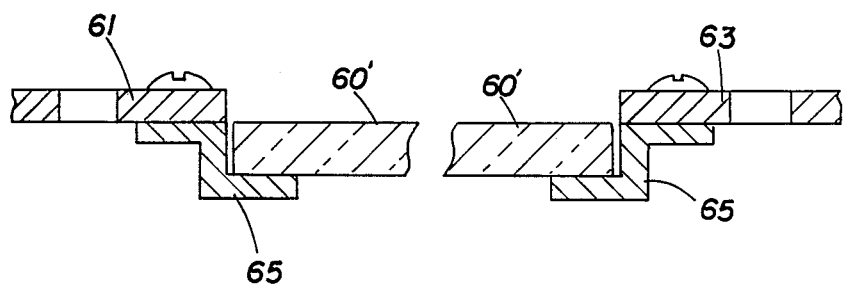
FIG. 8 is a sectional schematic view illustrating the supports for the plates taken along lines 8—8 of FIG. 7.

Alternatively, it may be desirable to limit the use of the previously specified glass ceramic material to the area generally above the lower burners, as shown in FIG. 7. In this case, the glass plates will tend to be completely self-cleaning. Three narrow unapertured glass ceramic plates 60' cover burner 18. Similar IR transparent plates 62' are mounted above burner 20. Two apertured metal plates 61 flank the glass ceramic burner covers 60' and 62' and a single larger apertured metal plate 63 spans the space between the glass ceramic covers. Plates 61 and 63, made of metal such as stainless steel, are apertured like the glass ceramic elements of FIGS. 1 and 5, to admit upward convection flow into the oven chamber. Elongated rail like metal brackets 65 support the glass ceramic burner covers 60' and 62' as shown in FIG. 8. The metal plates 61 and 63 are fastened along their edges to the tops of the brackets 65 by machine screws as shown.

As a further alternative, each plate 60 and 62 of FIG. 1 can be formed as three separate plates (not shown) with the unapertured plate directly above an IR burner formed of glass ceramic and the apertured plates adjacent to each glass ceramic plate formed of metal.

Figure 9:
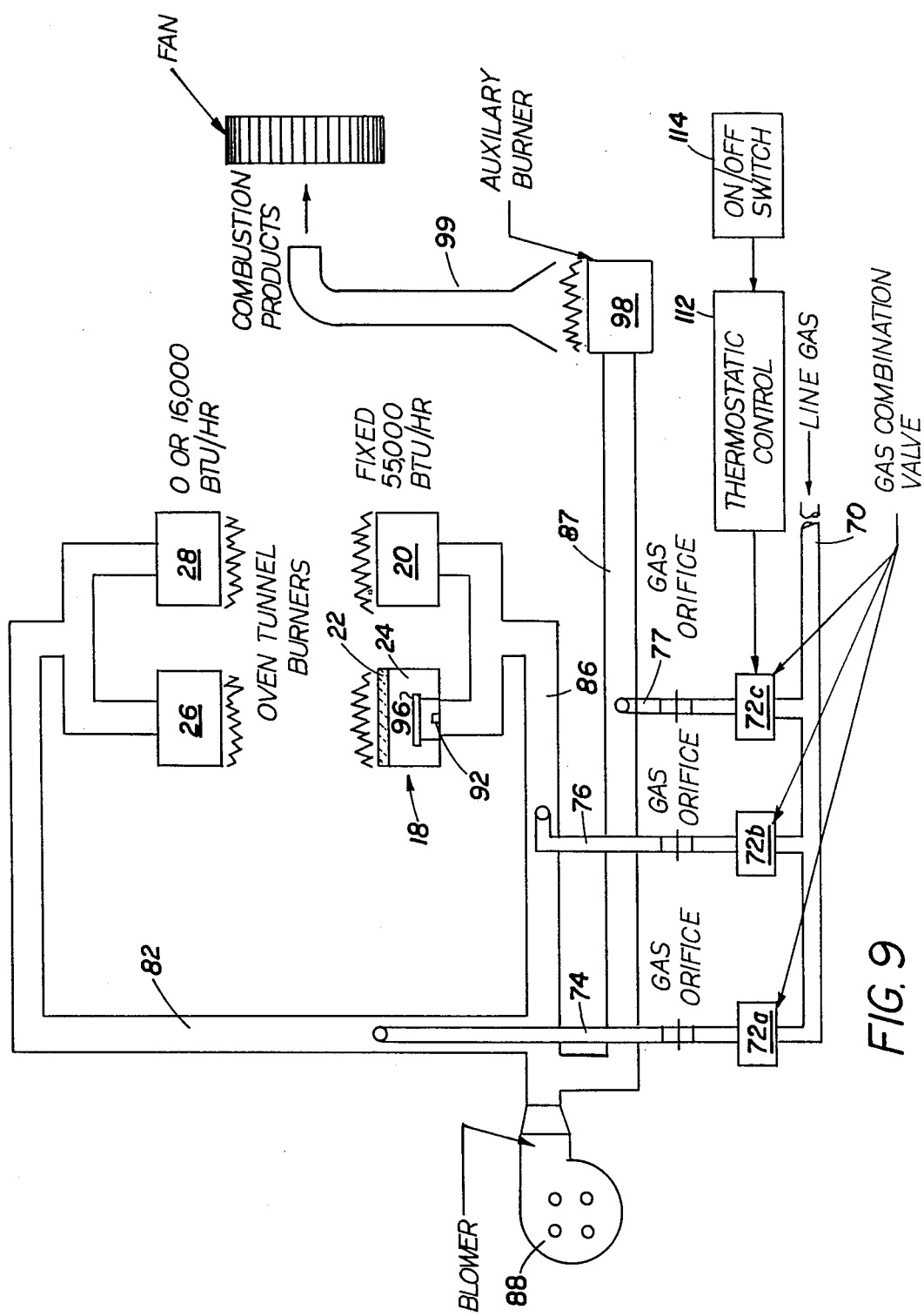
FIG. 9 is a schematic diagram illustrating the gas lines for fueling the burners of the oven of FIGS. 1–6.

As indicated in FIG. 9, pressurized fuel gas is delivered through a line 70 connected to a utility gas service line to three gas combination valves 72a, 72b and 72c which feed the upper and lower gas branches 74 and 76 and the auxiliary burner gas line 77. Each valve is followed by a respective orifice plate as shown. Gas line 74 is piped into the upper gas/air supply line 82 connected in parallel to the inlets of the IR strip burners 26 and 28 as shown. Gas combination valve 72a regulates the loading of the upper gas burners. Lower gasbranch 76 is connected to the gas/air supply line 86 which is connected in parallel to supply the lower burners 18 and 20. Valve 72b sets the loading of the lower burners. Gas line 77 lets gas into gas/air supply line 87 for the auxiliary burner 98. Gas/air supply lines 82, 86 and 87 are connected in common to a blower 88 which supplies combustion air and forces the mixture into the burner plenums under sufficient pressure to support stable flames on the porous ceramic tile burners.

As exemplified by burner 18 in FIG. 9, the air/gas mixture for the upper and lower strip heaters is fed to a nozzle 92 placed approximately at the midpoint of each elongated burner plenum 24. Attached to the burner plenum 24, a short, apertured burner baffle 96 over the nozzle 92 aids in distributing the gas/air mixture. Preferably, burners 18, 20, 26 and 28 are ignited by means of one or more glow plug igniters (not shown).

The auxiliary burner is regulated by gas combination valve 72c which, unlike the upper and lower burners, is thermostatically controlled. The thermostatic control 112 turns the auxiliary burner on or off while the oven is in use. During normal operation when food products are travelling through the oven, the auxiliary burner is cycled on and off to maintain a set temperature. In the idling condition, with no food input, the auxiliary burner is switched completely off. This function can be accomplished manually or automatically. The ON/OFF switch 114 can take the form of a simple sensor circuit (not shown), such as a light beam interrupted by food on the belt and a photodetector connected to a retriggerable delay circuit which allows a sufficient interval to lapse before returning to the idle mode.

OPERATION

As shown in FIGS. 4-6, an uncooked product 110 such as pan pizza is conveyed into the oven tunnel by means of the continuous belt 16. The lower IR strip burners 18 and 20, preferably operating at a combined rate of about 55,000 BTU's per hour, radiate IR energy from the glowing surface of the ceramic tile 22 upward through the IR transparent glass plates 60 and 62. The radiation passes through the glass plates to the underside of the food product, or pan carrying the food product. Simultaneously, the upper IR burners 26 and 28 radiate IR energy from their tiles 22 and from the screens 30, which also become red hot, downward toward the surface of the food product. The input rate of the two upper burners combined is preferably no more than about a third of that of the lower burners, typically about 16,000 BTU's per hour.

Simultaneously, the convection heating system circulates hot air toward the conveyor 16 and out the side of the oven tunnel 14. In particular, the centrifugal fan 54 as shown in FIGS. 4 and 6 draws air transversely out of the oven tunnel into the convection manifold 58 and back into the six plenums. The upper plenums 34, 36 and 38 operate to force air out the bottom of the distribution plates 34a, 36a and 38a toward the upper surface of the food products passing beneath. The lower ducts 44, 46 and 48 operate to force hot air up through the diffuser screens 44a, 46a and 48a into the narrow space between the screens and the glass plates 60 and 62 (or apertured metal plates 61 and 63, FIG. 7) and out through the apertures 60a and 62a in the plate. The convection air passing up through the apertures in the plates impinges on the bottom surface of the food product. Hot air entering the oven tunnel via the upper distribution plates and lower plate apertures is ultimately drawn back out through port 52 and recirculated into the plenum 58 via the fan 54. Heat is transferred to the recirculating air by the surrounding surfaces which have been heated by the infrared burners, and also by the auxiliary burner 98.

Door 102 (FIGS. 1 and 6) on the side of the cabinet 10 opposite from the motor 56 can be opened for access to the middle of the oven tunnel. By introducing food products into the oven from the side door, the oven can be operated as a half oven if desired for items which require less cooking.

In operation, the IR transparent plates 60 and 62, (or 60' and 62', FIG. 7) protect the ceramic tile burners 22 of the lower IR units 18 and 20 from food particles and deposits. In fact, substances which collect or plate out on the glass above the IR burners, are incinerated by IR radiation which "self-cleans" the area of the surface of the glass plates directly above the IR burners. For additional cleaning, the plates 60 and 62 can be easily removed or replaced. Plates 60' and 61' (FIG. 7) should be almost totally self-cleaning since they are confined to the area directly above the burners.

ALTERNATE EMBODIMENT

Figure 10:
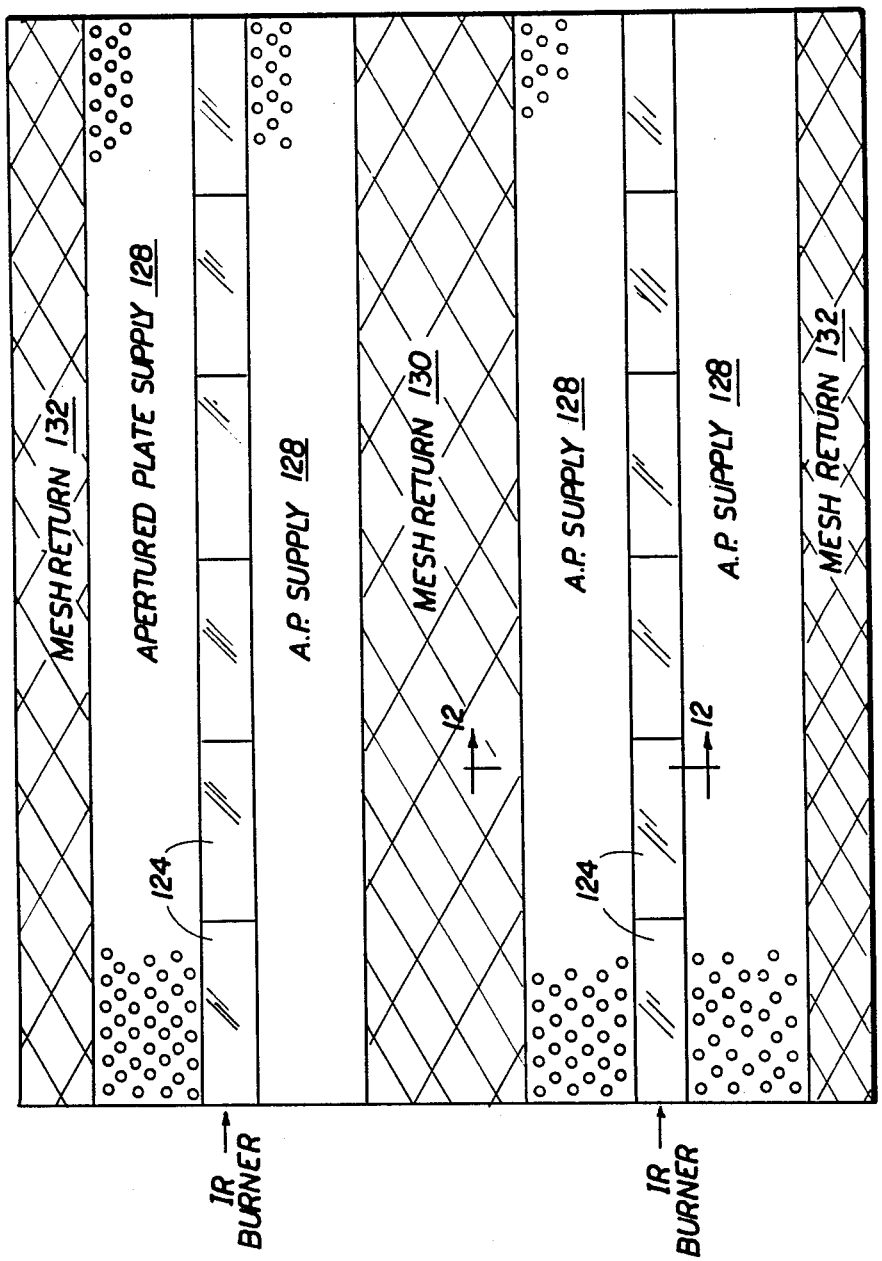
FIG. 10 is a schematic inverted plan view of the upper heating unit from the oven cavity, according to an alternate embodiment of the conveyor oven according to the invention.
Figure 11:
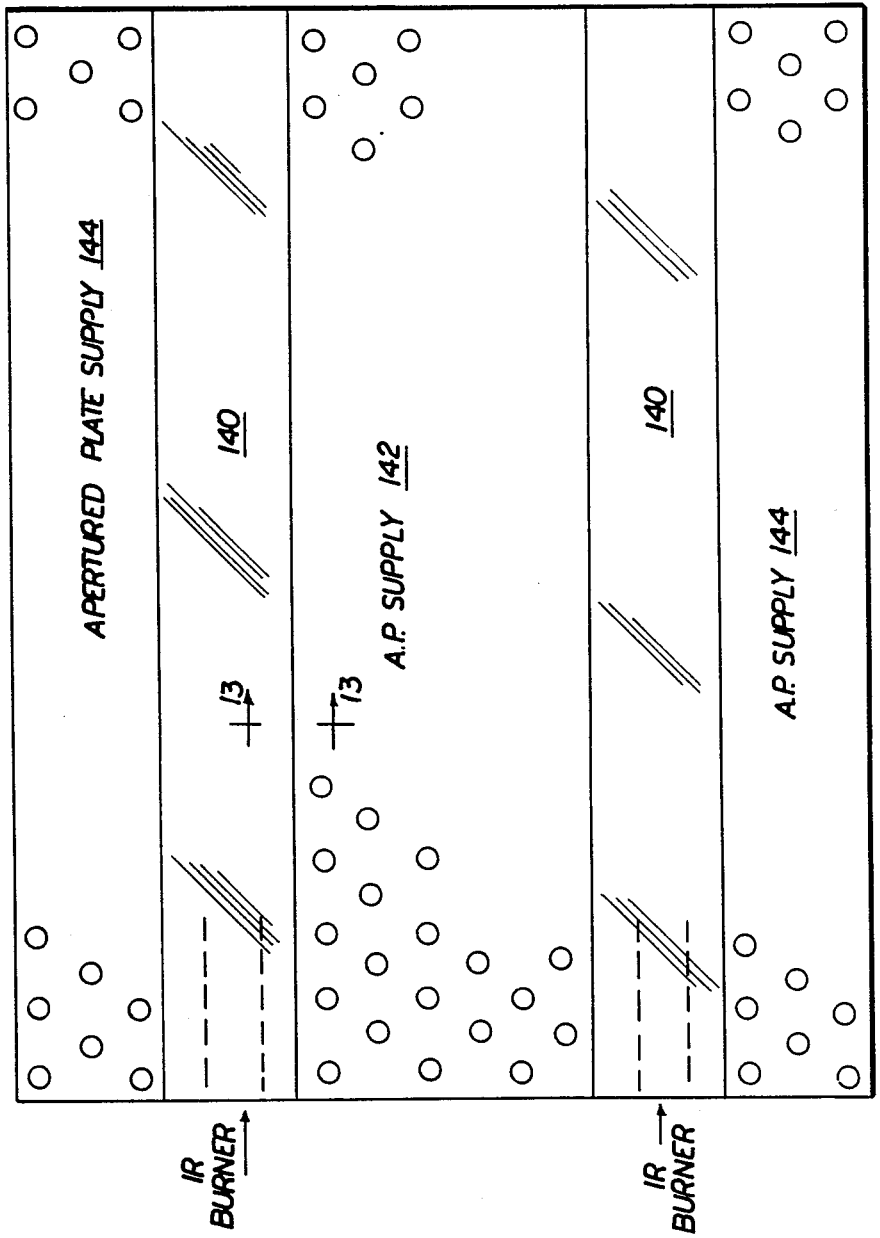
FIG. 11 is a plan view of the lower heating unit in the alternate embodiment of the conveyor oven of FIG. 10 according to the invention.
Figure 12:
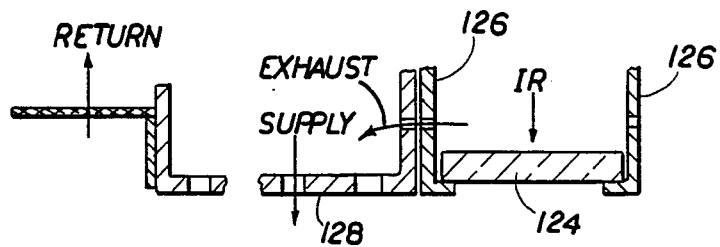
FIG. 12 is a sectional view of a portion of the upper unit taken along lines 12—12 of FIG. 10

FIGS. 10-14 illustrate an alternate embodiment of the conveyor oven according to the invention. The upper and lower heating units illustrated in FIGS. 10 and 11 contain opposed pairs of IR radiant burners similar geometrically to the arrangement in FIGS. 1 and 2 of the earlier described embodiment. Instead of wire mesh, the IR burners of the upper unit in FIGS. 10 are covered by IR transparent glass plates 124 laid end to end to span the width of the oven cavity similar to the glass plates shown for the lower heating unit in the embodiment of FIG. 7. Plates 124 are approximately two inches wide in the direction of conveyor belt travel. As shown in FIG. 12, plates 124 are suspended in brackets 126 forming the sidewalls of the enclosure or plenum for the upper burners. On either side of the IR burners in the upper unit 120 are apertured plates 128. Brackets 126 have a plurality of apertures along the length of the burner each of which is aligned with a respective aperture in the sidewall of the adjacent apertured plate 128 so that exhaust gas from the burner can pass into the supply duct and mix with the convection air as shown in FIGS. 12. As shown in FIG. 10, the upper unit 120 includes two pairs of apertured plates 128 surrounding the respective IR burners. In the middle of the upper unit 120 a large strip of mesh 130 is provided forming an opening to a convection air return duct (154, FIG. 14). Similar mesh returns 132 are provided on the outer ends of the upper unit 120 as shown in FIG. 10. Thus there are three return ducts and four supply ducts interleaved as shown in FIG. 10 forming the upper unit 120.

Figure 13:
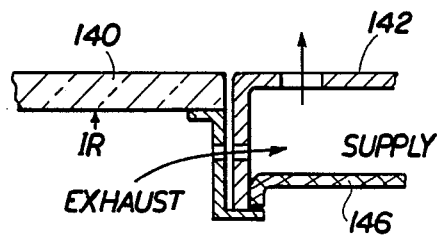
FIG. 13 is a sectional view of a portion of the lower unit taken along lines 13—13 of FIG. 11.

The lower unit 122 shown in FIG. 11 is similar to the lower unit shown in FIG. 7. Specifically, the IR burners in the lower unit 122 are covered by one-piece glass panels 140 each of which is approximately six inches wide in the direction of conveyor belt travel. The greater width of the IR transparent plates in the lower unit are on account of the higher output level of the lower burners. One wide apertured plate 142 in the middle spans the distance between the glass plates 140, and a pair of narrower apertured plates 144 are located at the ends of the lower unit 122 on the outside of the glass plates 140. The top surface of the glass plates and apertured metal plates 142 and 144 are all preferably flush, forming the floor of the oven cavity. Middle apertured plate 142, as shown in FIG. 13, carries screen mesh 146 which can be spot welded or otherwise secured to the depending side flange of the apertured plate 142. Apertures in the brackets supporting the glass plate 140 and along the side flange of the apertured plate 142 line up as shown in FIGS. 13 to allow the exhaust gases from the IR burner to enter the adjacent supply duct. Apertured plates 144 are similarly constructed and include aligned holes to receive exhaust from the burners. The duct work for the lower unit 122 is similar to that shown for ducts 44, 46 and 48 in FIG. 5 of the earlier described embodiment.

Figure 14:
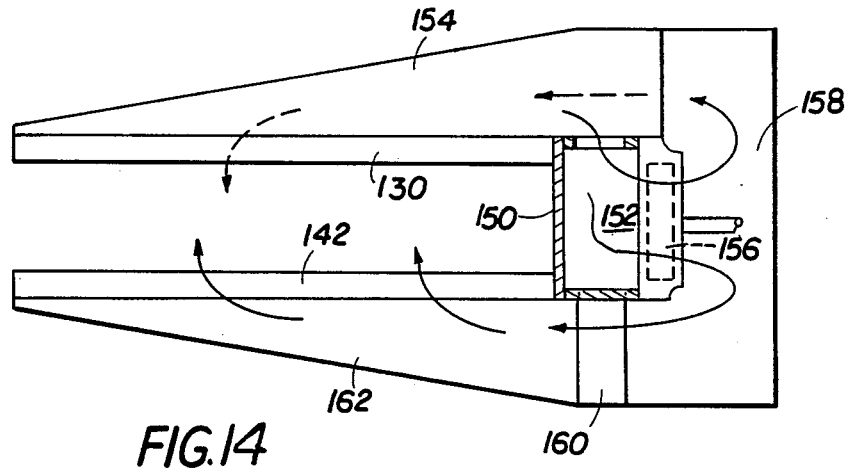
FIG. 14 is a schematic representation of the ductwork for the alternate embodiment of the conveyor oven of FIG. 10, the arrangement of the view being similar to that of FIG. 6.

As shown in FIG. 14, in the alternate conveyor oven design, the back of the oven cavity does not open directly into a central exhaust port but is closed off entirely by panel 150 which forms one side of exhaust plenum 152. The entrance to exhaust plenum 152 is from the top through three openings into plenums, such as central plenum 154 covered by mesh return 130 shown in FIG. 14. Air is exhausted from plenum 152 by means of a centrifugal fan 156 into manifold 158 which supplies air to the supply plenums in the upper and lower units 120 and 122. In FIG. 14, the supply air route is shown in phantom for the upper unit 120 since it is not in view. Air flowing through plenum 152 is heated by means of an auxiliary burner arrangement 160 similar to that shown in FIGS. 1-3 at 98 and 99. Air leaving manifold 158 enters the supply ducts in the upper and lower units. Specifically, air taking the upper route enters the two plenums surrounding the IR burners associated with the apertured plate supplies 128 (not shown in FIG. 14). Air taking the lower route from manifold 158 enters the three lower plenums associated with the apertured plate supplies in the lower unit 122, for example, plenum 162 associated with the middle apertured plate supply 142 as shown in FIG. 14.

The conveyor oven embodiment of FIGS. 10-14 operates similarly to the embodiments of FIGS. 1-7 to effect combined convection and radiant heating with opposed pairs of IR radiant burners with self-cleaning glass plates. Distributing the return vents in the middle and outer portions of the upper unit 120 across the entire width of the oven cavity is believed to aid in making the convection flow more uniform across the width of the oven.

EXAMPLE

An uncooked one pound, deep dish, cheese pizza was procured fresh, ready for baking, from a local pizza restaurant equipped with conventional conveyor ovens. The pizza was contained in a standard ten inch aluminum pie pan. Merely by way of illustration, the conveyor oven of FIGS. 1-6 according to the invention was fitted with apertured plates over the lower burners as in FIG. 7. The combined input rate to the lower burners was 55,000 BTU's/hr. The upper burner loading was set at 16,000 BTU's/hr. The auxiliary burner 98 was driven as shown in FIG. 9 and thermostatically controlled to cycle the auxiliary burner on and off to maintain approximately 500° F. at the midpoint of the oven. In the on condition the auxiliary burner rate was approximately 10,000 BTU's/hr. The pizza pan was placed on the conveyor belt. The conveyor belt speed was adjusted to provide a transit time of 5 minutes from the time the leading edge of the pan first crossed the threshhold as it entered the tunnel until the trailing edge of the pan emerged from the tunnel outlet. The pizza was removed from the pan and tested for doneness. All surfaces of the crust were well browned and the pizza topping and crust were thoroughly cooked all the way through. The pizza was sampled by experienced pizza eaters and found to have the taste and texture characteristics similar to commercially prepared deep dish pizza.

ADVANTAGES

The conveyor oven technology described above has compelling advantages in the preparation of fast foods, particularly in accelerating the cooking of foods having a combination of ingredients, including dough and other materials for which surface heating is desirable. The advanced heat transfer technology embodied in the present conveyor oven combines the additive heat flux of radiant IR with convective mode heating.

Hot air impingement heating is highly desirable for heating irregular surfaces such as pizza, but is incapable of true broiling. Convective heating is better at moisture removal, the primary process of heating, than is infrared heating. The forced air stream disturbs the insulating boundary layer around the food product and bathes it continuously in hot, relatively low humidity air. However, during hot air baking, as the surface dries and crusts over, it forms an insulating barrier and less heat is conducted into the food. Food can be cooked to a similar degree of doneness faster by means of infrared heating than by hot air since more heat can be conducted into the center of the food product without overcooking the surface.

In the present invention, these two independent modes of heating are juxtaposed to overcome the shortcomings of one or the other type of heating alone. Thus, the severity of convective mode drying can be alleviated by transferring heat in the form of radiant energy, which has a tendency to seal moisture into food products. In addition, the provision of radiant and convective heating both above and below the food product offers the opportunity to adjust the degree of convective versus radiant heat transfer to the top and bottom surfaces independently.

In a pizza carried by a pan, the most common cooking mode practiced in pizza chains today, convective heating can predominate on the top surface while infrared heating can predominate on the bottom of the pan. Thus, convective heating may be concentrated where it will do the most good, i.e., in browning the top surface of the pizza and infrared heating can be concentrated where it will do the most good, namely, on the bottom of the pan which is not only more absorptive of IR radiation, but is also relatively less benefited by air flow impingement since moisture removal is not usually possible through the bottom of the pan. If desired, however, apertured pans can be employed to further decrease cooking time.

The degree of total flux contributed by the radiant and convective modes of heat transfer can be controlled by modulating both the temperature of the recirculating air by the auxiliary burner 98 (or fresh air dilution), and the gas input rate to the radiant burners which can be individually controlled or controlled in upper or lower pairs as shown herein. The patterns and sizing of the jet openings and lower plate apertures can also be adjusted to vary the proportion of convective air from the top and bottom ducts.

It may also be advantageous to vary the proportions of convective and radiant heating in the two halves of the oven. For example, food containing initially a large amount of water will have relatively high heat conductivity which is particularly susceptible to radiant heating. By applying IR, the entire mass heats up more quickly than by using convection alone. Thus, the initial half of the oven could have relatively reduced convective heating by downsizing the apertures in the first upper plenum 36 and either the screen mesh size of the first lower duct 44 or the size and/or the number of apertures in the plates 60 and 62 (61, 63, FIG. 7). In addition, the gas input to the upper and lower burners 26 and 18 can be separately adjusted if desired to be greater than that of the second opposed pair of burners. Thus, in the second half of the oven, the baking food product having been predominantly cooked via IR, will now encounter a relatively increased degree of convective heating. Not only the rate of heat transfer but also the mode of heat transfer can be varied along the oven tunnel. Thus, the design of the present invention allows elaborate optimization procedures to hasten the cooking time of complex food products such as pizza. In addition, the oven is flexible enough in design and operation to accommodate pure broiling or pure convective heating tasks or a combination of both, normally encountered in fast food chains. Thus, while versatile, the oven can be fine tuned to achieve high standard operating speeds for specific repeated cooking tasks while retaining the efficiency and ease of operation of the conveyor oven configuration.

The foregoing description has been directed to specific embodiments for the purposes of illustration. Many variations and modifications designed for the same applications or other applications are posssible without departing from the principles of the invention. Other embodiments are within the spirit and scope of the invention as claimed below.

We claim:

1. A conveyor oven, comprising a cabinet defining an oven tunnel for receiving food products;
    a conveyor for moving food products along a cooking path in said tunnel,
    at least one composite heating unit in said cabinet on either side of said cooking path, said heating units each including at least two spaced elongated forced air convection ducts, each having a porous wall facing said cooking path and defining a plurality of openings for directing parallel streams of hot air toward the food products, and between said ducts, an infrared (IR) strip heater element substantially coextensive with the width of said oven tunnel; and
    a primary source of input heat energy for said IR heater separate from and independent of said ducts,
    said oven operable to heat food products on the conveyor simultaneously by convective energy and infrared radiant energy.

2. The oven of claim 1, wherein there are two said heating units, an upper heating unit on the upper side of the cooking path and a lower heating unit on the lower side of the cooking path.

3. The oven of claim 2, wherein the IR strip heaters of said heating units are arranged in opposed parallel relationship on the upper and lower sides of said cooking path.

4. The oven of claim 2, further comprising separate controls for the upper and lower IR strip heaters.

5. The oven of claim 2, further comprising a plate of material transmissive to infrared radiation, said plate interposed between said lower heating unit and said cooking path.

6. The oven of claim 5, wherein said plate is apertured so as to be operable to transmit IR radiant energy toward said food products and to pass convection air from said duct through the apertures in said plate toward said food products, said plate being substantially free of apertures in the area directly between the IR strip heater of said lower heating unit and said cooking path.

7. The oven of claim 1, wherein at least one heating unit includes at least three said ducts and two IR strip heaters in the spaces between adjacent ones of said ducts, said heaters being parallel to each other and lying substantially in the same surface parallel to said cooking path.

8. The oven of claim 1, wherein said IR strip heater includes a gas burner.

9. The oven of claim 8, wherein said gas burner includes a porous ceramic burner element configured in an elongated straight bar extending substantially the width of the oven tunnel.

10. The oven of claim 9, wherein said ceramic burner element is made up of plural segments aligned end to end.

11. A conveyor oven, comprising
a cabinet defining an oven tunnel for receiving food products;
a conveyor for moving food products along a cooking path in said tunnel; and
at least one heating unit situated in said cabinet facing said cooking path, said heating unit including an elongated hot air convection duct substantially coextensive with the width of said oven tunnel with a porous wall facing said cooking path and defining a plurality of openings for directing parallel streams of hot air toward said food products and an IR strip heater substantially coextensive with the width of said oven tunnel juxtaposed with said convection duct with a primary source of input heat energy for said strip heater separate from the hot air in said convection duct and independent thereof; and
means for independently controlling the heat input to said convection duct and the heat energy produced by said IR strip heater.

12. The oven of claim 11, wherein said strip heater includes a gas burner.

13. The oven of claim 12, wherein said gas burner includes a porous ceramic burner element in the shape of a bar extending substantially the width of the conveyor oven.

14. A conveyor oven, comprising
a cabinet having walls defining an oven tunnel for receiving food products,
a conveyor for moving food products along a cooking path in said tunnel,
a heating unit situated in said cabinet facing said cooking path, said heating unit including a convection duct substantially coextensive with the width of said oven and adapted to exhaust hot air toward food products in said cooking path, and an elongated IR strip heater element substantially coextensive with the width of the oven tunnel arranged alongside and parallel to said convection duct; and
a plate disposed between said heating unit and said cooking path, said plate having apertures for directing hot air from said convection duct towards food products and including a portion between said IR strip heater and said conveyor which is transmissive to IR radiant energy produced by said IR strip heater.

15. The oven of claim 14, wherein said plate is approximately parallel to said cooking path.

16. The oven of claim 14, wherein the portion of said plate directly in line between said IR strip heater and said conveyor is substantially free of apertures.

17. The oven of claim 14, wherein said IR strip heater has an energy source independent of the hot air in said convection duct.

18. The oven of claim 17, wherein said IR strip heater includes a gas burner.

19. The oven of claim 18, wherein said gas burner includes a porous ceramic burner element arranged in the shape of a bar across the width of the oven tunnel.

20. The oven of claim 14, wherein said plate is substantially coextensive with the width of the oven tunnel, thus being interposed as a barrier between both the cooking path and the convection duct and IR strip heater over the entire width of the oven tunnel.

21. The oven of claim 14, wherein a plurality of said plates are juxtaposed.

22. The oven of claim 21, wherein said juxtaposed plates are collectively substantially coextensive with the width of the oven tunnel.

23. The oven of claim 21, wherein said plates are removable.

24. The oven of claim 14, wherein said plate includes a section of glass ceramic material in line between said IR strip heater and said conveyor, and an apertured section of metal in line between said convection duct and said conveyor.

25. The oven of claim 14, including a centrifugal fan disposed adjacent to one of the walls of said cabinet and outside of said oven tunnel, said one wall having an opening providing communication between said oven tunnel and said fan, said fan operable to withdraw gases from the oven tunnel and recirculate gases to said convection duct.

26. A conveyor oven, comprising
a cabinet having walls defining an oven tunnel of predetermined length and width for receiving food products,
a conveyor for moving food products along a cooking path in the direction of the length of said tunnel,
a first pair of elongated parallel IR strip heaters approximately coextensive with the width of said oven tunnel arranged in opposed relationship on opposite sides of said cooking path, respectively, facing said cooking path, said first pair of IR strip heaters being displaced approximately one-quarter of the length of the oven tunnel from the longitudinal midpoint thereof,
a second pair of elongated parallel IR strip heaters approximately coextensive with the width of said oven tunnel arranged in opposed relationship on opposite sides of said cooking path, facing said cooking path respectively, said second pair of said strip heaters being displaced from the midpoint in the opposite direction by the same distance as the first pair of heating elements, and at least one convection heating duct between the heaters on at least one side of said cooking path having a porous wall facing said cooking path for directing hot air toward the food products.

27. The oven of claim 26, further comprising means for independently controlling the heat input to said convection duct and said heating elements.

28. The oven of claim 26, further comprising a plurality of said convection ducts alongside said strip heaters on either side of said cooking path, at least one of said ducts being situated between two of said strip heaters.

29. The oven of claim 26, further comprising
a plate of material transmissive to IR radiation situated between said cooking path and one of said IR strip heaters,
said plate permitting passage of IR radiation from said IR strip heater through the plate to the food products.

30. A conveyor oven, comprising
a cabinet housing an oven tunnel for receiving food products and a recirculation plenum adjacent to said oven tunnel,
an internal partition separating said oven tunnel and plenum,
a conveyor for moving food products along a cooking path in said tunnel,
a heating unit situated in said cabinet facing said cooking path, said heating unit including at least one convection heating duct substantially coextensive with the width of said oven and adapted to exhaust hot gases toward food products in said cooking path,
said partition between said recirculation plenum and said oven tunnel having an elongated opening extending the length of said oven tunnel,
a centrifugal fan operatively disposed in said plenum, said centrifugal fan having a circular inlet,
a transition mounted in said plenum for connecting said enlongated opening to said circular inlet of said centrifugal fan,
an elongated auxiliary burner duct,
a gas burner housed in said auxiliary duct,
an opening in said transition, said auxiliary duct being connected to said opening in said transition so as to allow exhaust gases from said gas burner to flow directly into said transition, and
said partition having at least one additional opening forming an inlet to said at least one convection duct,
whereby, said centrifugal fan draws gases from said oven tunnel and said auxiliary duct into said plenum and recirculates said gases to the oven tunnel via the convection heating duct.

31. The conveyor oven of claim 30, further comprising
thermostatic control means for switching said gas burner on or off to maintain a set temperature in said oven tunnel.

32. The conveyor oven of claim 30 further comprising an elongated IR strip heater substantially coextensive with the width of the oven tunnel arranged alongside and parallel to said convection duct, said IR strip heater having an energy source independent of the hot gases in said convection duct.

33. The oven of claim 32 wherein said IR strip heater includes a gas burner separate from said auxiliary duct gas burner.

34. A conveyor oven, comprising a cabinet housing an oven tunnel for receiving food products and a recirculation plenum adjacent to said oven tunnel,
an internal partition separating said oven tunnel and plenum,
a conveyor for moving food products along a cooking path in said tunnel,
upper and lower heating units situated in said cabinet facing said cooking path, each said heating unit including at least one convection heating supply duct substantially coextensive with the width of said tunnel and adapted to exhaust hot gases toward food products in said cooking path,
said upper heating unit including at least one return duct with an opening facing the cooking path coextensive with the width of said tunnel and extending alongside said supply duct, said return duct leading into said plenum,
means for heating air in said plenum, and
forced air means for exhausting air from said plenum into said supply ducts to recirculate convection air.

35. The oven of claim 34, further comprising an IR strip heater with an energy source independent of said convection air coextensive with the width of the oven tunnel and arranged alongside the supply duct in the upper heating unit.

36. The oven of claim 35, further comprising a plurality of return ducts two of which are arranged on opposite sides of said adjacent convection air supply duct and IR strip heater in the upper heating unit.

37. A method of cooking food products, comprising
defining an oven tunnel for receiving food products,
conveying food products along a cooking path in said tunnel,
blowing hot gases toward said food products moving along said cooking path to effect convective heating,
exhausting said hot gases from said oven tunnel and recirculating said exhausted hot gases back into said oven tunnel,
simultaneously transferring energy to said food products with infrared energy from a primary source of input heat energy separate from the hot gases used in said convective heating and independent thereof, and
independently controlling the heat input to said hot gases used in said convective heating and the heat energy produced by said infrared radiation.

38. The method of claim 37, further comprising
heating said hot gases by combining the exhaust gas from an auxiliary gas burner located outside of said oven tunnel with said hot gases.

39. The method of claim 37, further comprising
withdrawing hot gases from the oven tunnel, mixing them with the exhaust gas from a gas burner outside of said oven tunnel and recirculating said combined hot gases and exhaust gas to said oven tunnel and blowing of said combined hot gases and exhaust gas toward said food products moving along the cooking path to effect convective heating.

40. The method of claim 39, further comprising thermostatically controlling said gas burner.

41. The method of claim 37, further comprising blowing said hot gases at said food products from both sides of said cooking path while simultaneously transferring energy to said food products with infrared energy independent of said hot gases from both sides of said cooking path.

42. A method of cooking food products, comprising
defining an oven tunnel for receiving food products,
conveying food products along a cooking path in said tunnel,
transferring energy to hot gases within said oven tunnel from the exhaust of a primary gas burner located within said oven tunnel, and
withdrawing said hot gases from said oven tunnel, combining them with the exhaust from an auxiliary gas burner located outside of said oven tunnel to form combined convection gases and recirculating said combined convection gases to said oven tunnel and directing said combined convection gases toward said cooking path to effect convection heating of food products traveling along said cooking path.

43. The method of claim 42, further comprising thermostatically controlling said auxiliary gas burner.

44. A conveyor oven, comprising
a cabinet defining an oven tunnel for receiving food products,
a conveyor for moving food products along a cooking path in said tunnel,
a lower heating unit in said cabinet below said cooking path, said lower heating unit including at least two spaced elongated forced air convection ducts, each having a plurality of openings facing said cooking path for directing parallel streams of hot air toward the food products, and between said ducts, an infrared (IR) strip heater element substantially coextensive with the width of said oven tunnel; and
a primary source of input heat energy for said IR heater separate from and independent of said ducts,
said oven operable to heat food products on the conveyor simultaneously by convective energy and infrared radiant energy.

45. The oven of claim 44, wherein said lower heating unit includes at least three said ducts and two IR strip heaters in the spaces between adjacent ones of said ducts, said heaters being parallel to each other and lying substantially in the same surface parallel to said cooking path.

46. The oven of claim 44, wherein said IR strip heater includes a gas burner.

47. The oven of claim 46, wherein said gas burner includes a porous ceramic burner element configured in an elongated straight bar extending substantially the width of said oven.

48. The oven of claim 47, wherein said ceramic burner element is made up of plural segments aligned end to end.

49. The oven of claim 44, further comprising
an upper heating unit in said cabinet above said cooking path, said upper heating unit including at least one said elongated forced air convection duct having a plurality of openings facing said cooking path for directing parallel streams of hot air toward the food products.

* * * * *

UNITED STATES PATENT AND TRADEMARK OFFICE
CERTIFICATE OF CORRECTION

PATENT NO. : 4,951,648

DATED : August 28, 1990

INVENTOR(S) : Shukla et al.

It is certified that error appears in the above-identified patent and that said Letters Patent is hereby corrected as shown below:

Column 4, line 14, "distances" should be --distance s--.
Column 4, line 67, "47/16" should be --4 7/16--.
Column 5, line 57, "rail like" should be --rail-like--.

Signed and Sealed this

Twenty-first Day of April, 1992

Attest:

HARRY F. MANBECK, JR.

*Attesting Officer*     *Commissioner of Patents and Trademarks*